US009307340B2

(12) United States Patent
Seefeldt

(10) Patent No.: US 9,307,340 B2
(45) Date of Patent: Apr. 5, 2016

(54) AUDIO SYSTEM EQUALIZATION FOR PORTABLE MEDIA PLAYBACK DEVICES

(71) Applicant: Dolby Laboratories Licensing Corporation, San Francisco, CA (US)

(72) Inventor: Alan Jeffrey Seefeldt, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 468 days.

(21) Appl. No.: 13/670,247

(22) Filed: Nov. 6, 2012

(65) Prior Publication Data

US 2013/0066453 A1 Mar. 14, 2013

Related U.S. Application Data

(63) Continuation of application No. PCT/US2011/032332, filed on Apr. 13, 2011.

(51) Int. Cl.

| | |
|---|---|
| ***G06F 17/00*** | (2006.01) |
| ***H04S 7/00*** | (2006.01) |
| *H04R 27/00* | (2006.01) |

(52) U.S. Cl.

CPC ................. *H04S 7/301* (2013.01); *H04R 27/00* (2013.01); *H04R 2227/003* (2013.01); *H04R 2420/07* (2013.01); *H04R 2499/11* (2013.01)

(58) Field of Classification Search

CPC .. H04S 7/301; H04R 27/00; H04R 2227/003; H04R 2420/07; H04R 2499/11

USPC ............................................................ 700/94

See application file for complete search history.

(56) References Cited

U.S. PATENT DOCUMENTS

| | | | |
|---|---|---|---|
| 4,340,780 | A | 7/1982 | Odlen |
| 4,688,258 | A | 8/1987 | Kunugi et al. |
| 4,694,498 | A | 9/1987 | Suzuki et al. |
| 4,739,513 | A | 4/1988 | Kunugi et al. |
| 5,386,478 | A | 1/1995 | Plunkett |
| 5,881,103 | A | 3/1999 | Wong et al. |
| 5,910,990 | A | 6/1999 | Jang |
| 6,195,435 | B1 | 2/2001 | Kitamura |
| 6,721,428 | B1 | 4/2004 | Allred et al. |
| 6,901,148 | B2 | 5/2005 | Yoshino et al. |

(Continued)

FOREIGN PATENT DOCUMENTS

| | | |
|---|---|---|
| DE | 102005039943 | 3/2007 |
| EP | 1677573 | 7/2006 |

(Continued)

OTHER PUBLICATIONS

ID3v2 draft specification; c1998.*

(Continued)

*Primary Examiner* — Paul McCord

(57) ABSTRACT

A method, an apparatus, a system, and instructions stored in a non-transitory computer-readable medium to instruct a processing system to carry out the method. The method includes applying corrective filters directly in a portable media device to correct, e.g., equalize for the overall system comprising the portable media device and the playback system to which it is attached. Also a method of determining the corrective filters by playing back one or more calibration signals on the playback system while recording the resulting sound field on the portable media device.

27 Claims, 6 Drawing Sheets

(56) References Cited

U.S. PATENT DOCUMENTS

| | | | | |
|---|---|---|---|---|
| 7,068,799 | B2 | 6/2006 | Ohta | |
| 7,079,852 | B1 | 7/2006 | Budnik | |
| 7,095,455 | B2 | 8/2006 | Jordan et al. | |
| 7,124,444 | B2 | 10/2006 | Yang | |
| 7,143,649 | B2 | 12/2006 | Yoshino | |
| 7,158,643 | B2 | 1/2007 | Lavoie et al. | |
| 7,346,326 | B2 | 3/2008 | Kim | |
| 7,471,988 | B2 * | 12/2008 | Smith et al. | 700/94 |
| 7,953,231 | B2 * | 5/2011 | Ishida | 381/74 |
| 8,027,487 | B2 * | 9/2011 | Park | 381/103 |
| 8,060,225 | B2 * | 11/2011 | Hans et al. | 700/94 |
| 8,285,405 | B2 * | 10/2012 | Goh | H04M 1/72522 700/94 |
| 8,498,441 | B2 | 7/2013 | Takayama | |
| 8,788,080 | B1 * | 7/2014 | Kallai et al. | 700/94 |
| 8,989,882 | B2 * | 3/2015 | Wollmershauser et al. | 700/94 |
| 2002/0072816 | A1 * | 6/2002 | Shdema et al. | 700/94 |
| 2002/0136414 | A1 * | 9/2002 | Jordan et al. | 381/58 |
| 2003/0108209 | A1 | 6/2003 | McIntosh | |
| 2005/0094822 | A1 * | 5/2005 | Swartz | 381/56 |
| 2005/0129252 | A1 * | 6/2005 | Heintzman et al. | 381/58 |
| 2005/0254662 | A1 | 11/2005 | Blank et al. | |
| 2006/0045281 | A1 * | 3/2006 | Korneluk et al. | 381/60 |
| 2006/0149402 | A1 * | 7/2006 | Chung | 700/94 |
| 2006/0161277 | A1 | 7/2006 | Robinson | |
| 2006/0280051 | A1 | 12/2006 | Petrella | |
| 2007/0086597 | A1 * | 4/2007 | Kino | 381/59 |
| 2007/0088806 | A1 * | 4/2007 | Marriott et al. | 709/217 |
| 2007/0098187 | A1 | 5/2007 | Lee et al. | |
| 2007/0105588 | A1 * | 5/2007 | Issa | 455/556.1 |
| 2007/0136770 | A1 | 6/2007 | Kim et al. | |
| 2007/0142942 | A1 | 6/2007 | Hyatt | |
| 2008/0002839 | A1 | 1/2008 | Eng | |
| 2008/0045140 | A1 * | 2/2008 | Korhonen | 455/3.06 |
| 2008/0077261 | A1 * | 3/2008 | Baudino et al. | 700/94 |
| 2008/0140235 | A1 | 6/2008 | McLean | |
| 2008/0175411 | A1 | 7/2008 | Greve | |
| 2008/0189065 | A1 | 8/2008 | Asada et al. | |
| 2009/0047993 | A1 | 2/2009 | Vasa | |
| 2009/0274312 | A1 * | 11/2009 | Howard et al. | 381/58 |
| 2010/0290643 | A1 * | 11/2010 | Mihelich et al. | 381/99 |
| 2010/0305725 | A1 * | 12/2010 | Brannmark et al. | 700/94 |
| 2012/0063614 | A1 * | 3/2012 | Crockett et al. | 381/98 |
| 2012/0294450 | A1 * | 11/2012 | Ozcan | 381/59 |

FOREIGN PATENT DOCUMENTS

| | | |
|---|---|---|
| JP | 2001-005464 | 1/2001 |
| JP | 2006-005902 | 1/2006 |
| JP | 2006-279863 | 10/2006 |
| JP | 2007-259391 | 10/2007 |
| JP | 2008-191005 | 8/2008 |
| JP | 2008-294620 | 12/2008 |
| JP | 2009-060209 | 3/2009 |
| JP | 2009-164943 | 7/2009 |
| KR | 20090045597 | 5/2009 |
| WO | WO 00/30277 | 5/2000 |
| WO | WO 01/63757 | 8/2001 |
| WO | WO2008146912 A1 | 12/2008 |
| WO | WO2009095161 | 8/2009 |
| WO | WO 2009/134537 | 11/2009 |
| WO | WO 2010/120394 | 10/2010 |
| WO | WO 2011/115944 | 9/2011 |

OTHER PUBLICATIONS

Japanese Office Action on JP counterpart JP2013-509080 mailed Nov. 12, 2013, and English translation of the office action.

International Search Report on PCT Application PCT/US2011/032332 mailed Jul. 5, 2011.

International Preliminary Report on Patentability on PCT Application PCT/US2011/032332 mailed May 24, 2012.

Written Opinion of the International Preliminary Examining Authority on PCT Application PCT/US2011/032332 mailed Feb. 27, 2012.

Office Action for counterpart Japanese Application JP2013-509080 mailed Apr. 15, 2014 (with an English translation).

Office Action for counterpart Japanese Application JP2013-509080: mailed Jan. 27, 2015 (with an English translation).

Office Action for counterpart Chinese Application CN201180022627.1 mailed Jul. 14, 2014 (& English translation).

Extended European Search Report for EP Application No. 15178118.4, mailed Jan. 20, 2016.

* cited by examiner

AUDIO SYSTEM EQUALIZATION FOR PORTABLE MEDIA PLAYBACK DEVICES

CROSS REFERENCE TO RELATED PATENT APPLICATIONS

This application is a continuation of International Application No, PCT/US2011/032332 having an international filing date of 13 Apr. 2011. PCT/US2011/032332 claims priority to U.S. Provisional Patent Application No. 61/332,159 filed 6 May 2010. The entire contents of both PCT/US2011/032332 and U.S. 61/332,159 are hereby incorporated by reference.

FIELD OF THE INVENTION

The present disclosure relates generally to audio signal processing and in particular to audio system equalization for portable media devices.

BACKGROUND

Portable media devices have become an extremely common way for playback of media. Devices that playback digitally stored audio, such as iPods® and mobile phones are used for the playback of both music and audiovisual content. An increasing trend for such devices is their attachment to a wide variety of reproduction devices and systems for playback of the audio. For example, a user might attach her iPod to a home theater system that include speakers, to a TV with speakers, or to a standalone docking station with speakers. Each of these is an example of a different playback system to which the same portable device might be attached.

Even though portable playback devices for digitally stored audio have been available for more than a decade, and portable devices for playback of digitally stored audio on disk or tape have been around for decades, there still is a need for equalization of playback of audio from such devices when connected to one of a set of possible playback systems. As examples of how long such devices have been commercially available, the RIO® portable playback device by Diamond Multimedia, of California, was introduced in 1998 for MP3 playback. The PJB-100 Personal Jukebox by HanGo Electronics Co., Ltd. of South Korea is generally acknowledged to be the first hard-drive based device and was commercially introduced in 1999. The Apple IPOD was introduced in 2001. Each of these devices included a digital processor in order to decompress and render the digitally stored compressed audio.

It would be advantageous to include in a portable media device equalization filters to be applied to audio signals directly in the portable media device to equalize for the overall system comprising the portable media device and the playback system to which it is attached for an improved listening experience. It further would be advantageous to include in the portable media device sets of equalization filters, each set applicable to a different ones of the playback systems to which the portable device might be attached to equalize for the overall system comprising the portable media device and the playback system to which it is attached. It also would be advantageous to have an end-user operated method of determining, using a portable media device, a set of equalization filters to use in the portable media device with a particular playback system to equalize for the overall system comprising the portable media device and the playback system to which it is attached.

DESCRIPTION OF EXAMPLE EMBODIMENTS

Overview

Figure 1A:
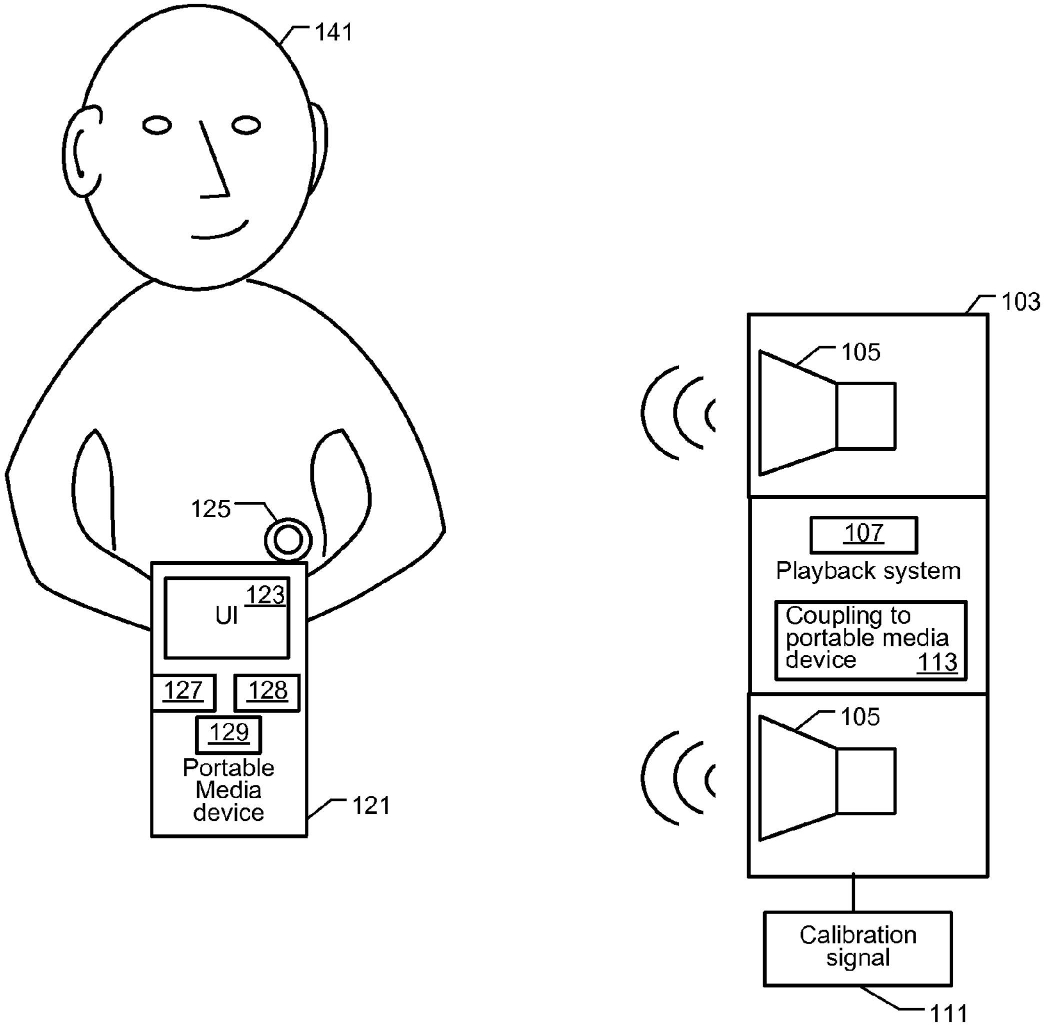
FIGS. 1A and 1B each show a simplified view of a user, a portable media device, and a playback system to which the portable media device can be coupled, with FIG. 1A showing the elements in a calibration mode, and FIG. 1B showing the elements in a playback mode.

Embodiments of the present invention include a method, an apparatus, a system, and logic encoded in a computer-readable storage medium to instruct a processing system to carry out the method. The method includes applying corrective filtering, e.g., equalization filtering directly in a portable media device at least to correct for, e.g., equalize for the overall system comprising the portable media device and the playback system to which it is attached.

Some embodiments include a method of operating a portable media device. The method comprises, while the portable media device is coupled to a particular playback system, playing back an audio signal on the portable media device and particular playback system combination in a particular listening arrangement while the portable media device applies a particular set of one or more corrective filters selected from a pre-stored collection of one or more sets of corrective filters or the data therefor. The collection of one or more sets of corrective filters or the data therefor is pre-stored in or for the portable media device. Each of one or more sets of the collection is associated with a corresponding listening arrangement and a corresponding playback system. The particular set of one or more corrective filters is determined by a calibration process that includes: recording on the portable media device a sound field resulting from one or more pre-defined calibration signals being played back on the particular playback system, the recording using a microphone built in or connected to the portable media device while the microphone is at one or more listener locations of the particular listening arrangement, analyzing the recording of the sound field to determine the particular set of one or more corrective filters at least to equalize for the particular playback system, and storing the data for the particular set of one or more corrective filters in or for the portable media device for the particular playback system.

Some embodiments include a method of operating a portable media device, comprising recording on the portable media device a sound field resulting from one or more predefined calibration signals being played back on a particular playback system, the recording using a microphone built in or connected to the portable media device while the microphone is at one or more listener locations of a particular listening arrangement. The method includes analyzing the recording of the sound field to determine a particular set of one or more corrective filters at least to equalize for the particular playback system, and storing the data for the particular set of one or more corrective filters in or for the portable media device for the particular playback system, such that while the portable media device is coupled to the particular playback system, an audio signal is playable on the portable media device and particular playback system combination in the particular listening arrangement while the portable media device applies the determined particular set of one or more corrective filters.

In some versions, the storing of the data for the particular set of one or more corrective filters is into a pre-stored collection of one or more sets of corrective filters or the data therefor stored in or for the portable media device, each of one or more sets of the collection being associated with a corresponding listening arrangement and a corresponding playback system.

Some embodiments include a portable media device that includes a playback subsystem configured to play back a selected audio signal, and a filter subsystem coupled to the playback subsystem and configured to apply a set of one or more corrective filters to an audio signal during playback of the audio signal. The portable media device further includes a coupling configured to couple the portable media device to a matching coupling included in a playback system; a user interface configured to accept input from a user; and a microphone or a coupling to a microphone. The filter subsystem is configured to apply a particular set of one or more corrective filters associated with a particular playback system and particular listening arrangement during playback of an audio signal via the particular playback system when the portable media device is coupled to the particular playback system in the particular listening arrangement. The particular set of one or more corrective filters is part of a collection of one or more sets of corrective filters or the data therefor pre-stored in or for the portable media device, each of one or more sets of the collection being associated with a corresponding listening arrangement and a corresponding playback system. In some versions, the portable media device is configured to record a sound field resulting from one or more pre-defined calibration signals being played back on the particular playback system, the recording using the microphone in or connected to the portable media device while the microphone is at one or more listener locations of the particular listening arrangement. In such some versions, the portable media device also is configured to analyze the recording of the sound field to determine the particular set of one or more corrective filters at least to equalize for the particular playback system; and store the data for the particular set of one or more corrective filters in or for the portable media device for the particular playback system.

Some embodiments include a portable media device that includes: means for playing back an audio signal, means for filtering configured to apply a set of one or more corrective filters to an audio signal during playback of the audio signal by the means for playing back; means for coupling the portable media device to a playback system; means for accepting input from a user; and means for recording a sound field. The means for filtering is configured to apply a particular set of one or more corrective filters associated with a particular playback system and particular listening arrangement during playback of an audio signal via the particular playback system when the portable media device is coupled by the means for coupling to the particular playback system in the particular listening arrangement. The particular set of one or more corrective filters is part of a collection of one or more sets of corrective filters or the data therefor pre-stored in or for the portable media device, each of one or more sets of the collection being associated with a corresponding listening arrangement and a corresponding playback system. Some versions of the portable media device further include: means for analyzing a recording of a sound field resulting from one or more pre-defined calibration signals to determine a set of one or more corrective filters; and means for storing the data for a set of one or more corrective filters. The means for recording is configured to record a sound field resulting from one or more pre-defined calibration signals being played back on the particular playback system at one or more listener locations of the particular listening arrangement, the means for analyzing is configured to analyze the recording of the sound field to determine the particular set of one or more corrective filters at least to equalize for the particular playback system; and the means for storing is configured to store the data for the particular set of one or more corrective filters in or for the portable media device for the particular playback system.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Some Embodiment

Figure 1B:
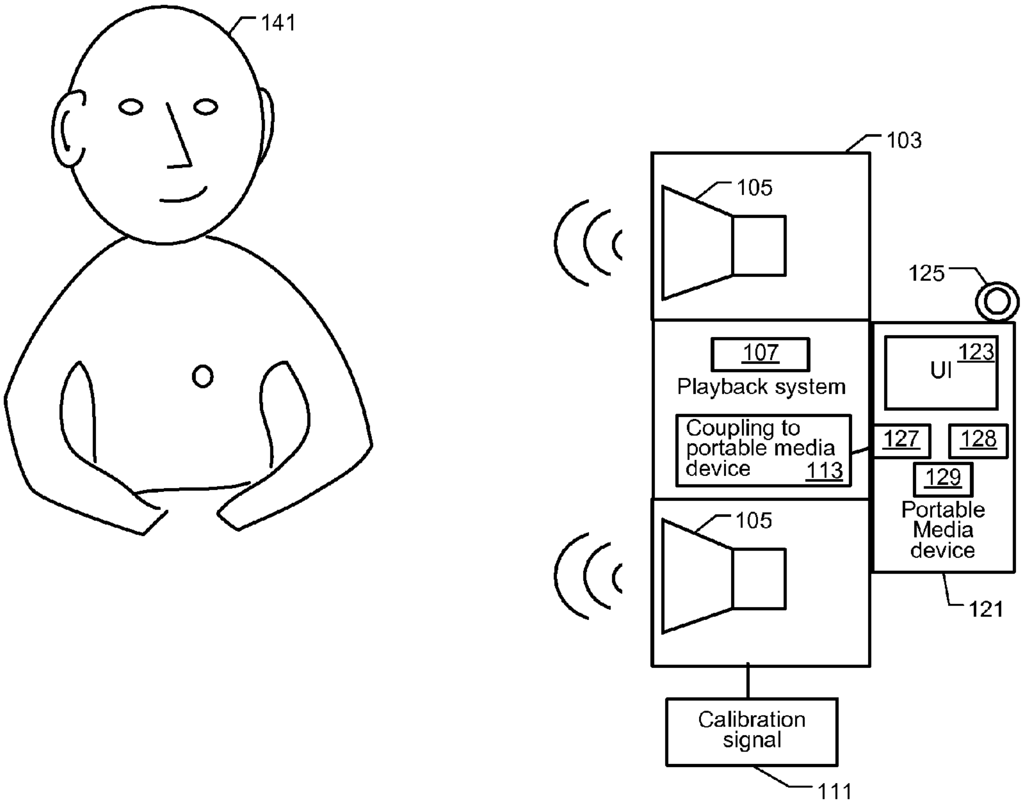

FIGS. 1A and 1B each shows a simplified view of a user 141, a portable media device 121, and a playback system 103 to which the portable media device can be coupled. These are example elements of example embodiments of the invention. FIG. 1A shows the elements in a calibration mode, while FIG. 1B shows the elements in a playback mode.

The portable media device 121 includes a coupling 127 configured to couple the portable media device to a matching coupling included in a playback system, in this case, the playback system 103. The portable media device 121 also includes a user interface 123, typically including a display device and a user input mechanism, such user input mechanism configured to accept commands from the user 141. The portable media device 121 also includes a playback subsystem 128 configured to play back a selected audio signal and a filter subsystem 129 coupled to the playback subsystem and configured to apply a set of one or more corrective filters to an audio signal during playback of the audio signal. Other elements not shown in these drawings, but shown in more detailed drawings of the device include a processor and a storage subsystem, elements of which are included in some embodiments in the playback subsystem 128 and the filter subsystem 129. The storage subsystem is configured to store data for one or more sets of corrective filters, and apply the data of a particular set to the filter subsystem.

The playback system 103 includes at least one loudspeaker 105—two are shown in this example playback system, and a playback module 107 that includes one or more audio amplifiers.

FIG. 1B illustrated one aspect of the invention, comprising normal playback of an audio signal from a media file stored in the portable media device 121 while the portable media device 121 is coupled to the playback system 103 via coupling 127 and 113 on the media device 127 and playback system 103, respectively. The user 141 is at a particular listener position. The particular listening environment and locations of the playback system and listener define a listening arrangement. The playing back of the audio signal on the portable media device and particular playback system combination is while the portable media device 121 applies using the filter subsystem 129 a particular set of one or more corrective filters selected for this particular playback system 103 and listening arrangement from a pre-stored collection of one or more sets of corrective filters.

As described in more detail below, the collection of one or more sets of corrective filters, e.g., in the form of data for the filters, is pre-stored in or for the portable media device 121 and listening arrangement. Each set of one or more corrective filters of the collection is associated with a corresponding playback system and corresponding listening arrangement.

FIG. 1A illustrates another aspect of the invention: a calibration process to determine the particular set of one or more corrective filters at least to equalize for a playback system and listening arrangement, in this example the particular playback system 103. The portable media device 121 either includes built in, or is connectable to at least one microphone 125. The calibration process includes recording on the portable playback device 121 a sound field resulting from at least one pre-defined calibration signal 111 being played back on the particular playback system 103 while the microphone 125 is at one or more desired listener locations of the listening arrangement. The calibration process includes analyzing the recording of the sound field to determine data for the particular set of one or more corrective filters at least to equalize for the particular playback system (and possibly also for the listening environment), and storing the data for the particular set of one or more corrective filters in or for the portable media device 121 for the particular playback system (and listening arrangement). Note that in some embodiments, the calibration process includes make recordings from several locations and the results averaged. Thus there may be more than one desired listening location associated with a listening arrangement.

In this manner, the data for a collection of sets of corrective filters is pre-stored in or for the portable media device, each set of the collection associated with a corresponding playback system and listening arrangement.

The Devices

The invention is not limited as to the type of portable media device. The minimum requirements are the ability to play digitally stored audio, having or being able to be connected to one or more microphones, and being able to be coupled to any one of a plurality of playback systems. Examples of portable media devices include, but are not limited to audio playback devices such as the Apple IPOD®, Sandisk SANSA®, Creative ZEN VISION®, Microsoft ZUNE®, and other models too numerous to list from other manufacturers. Examples also include, but are not limited to cellular telephones that have audio storage and playback capability, made by virtually every manufacturer of cellular telephones, and so-called "smart" cellular telephones such as the Apple IPHONE, Google NEXUS ONE, and many others too numerous to list. Many of these are able to play back not only digitally stored audio data, but also audiovisual content, such as digitally stored video files that may include digitally stored audio data.

The invention also is also not limited to the type of playback system. The minimum requirements are the inclusion of one or more speakers, and the ability to connect to a portable playback device, either directly by being docked thereto, by a wired connection, by a wireless connection, and via a wired or wireless network. The minimum requirements also include the ability to receive at least one signal that includes at least audio content from the portable playback device while connected thereto, and to playback at least the audio of the signal. The minimum requirements also include the ability to playback one or more calibration files, either stored in the playback system, loadable into a storage subsystem in the playback system, or sent to the playback system from an external calibration signal source. Examples of playback systems include, but are not limited to, so called docking speakers designed to include connectors for a specific model or models of portable media devices. For example, Amazon.com, a popular shopping Website in the USA, listed on 16 Mar. 2010 1,953 items for the search "iPod speaker" in the category electronics, and 1,295 items for the search "docking speaker." Examples of playback systems also include, but are not limited to, home theatre systems that include home theatre receivers, some of which also include connectors for specific model or models of portable media devices, while others include common input connectors such as phono (RCA) connectors and sockets for TRS (tip, ring, sleeve) or TRRS ((tip, ring, ring, sleeve) connectors. Examples of playback systems also include, but are not limited to, televisions that include or are connected to loudspeakers. Such televisions commonly include connectors for external audio. Examples also include, but are not limited to, automotive audio systems that in 2010 commonly include connectors for specific model or models of portable media devices, and/or common input connectors such as sockets for a TRS (tip, ring, sleeve) or TRRS ((tip, ring, ring, sleeve) connector.

Embodiments of the present invention are particularly useful because a particular portable media device can be connected to more than one playback system.

An Example Portable Media Device

Figure 2:
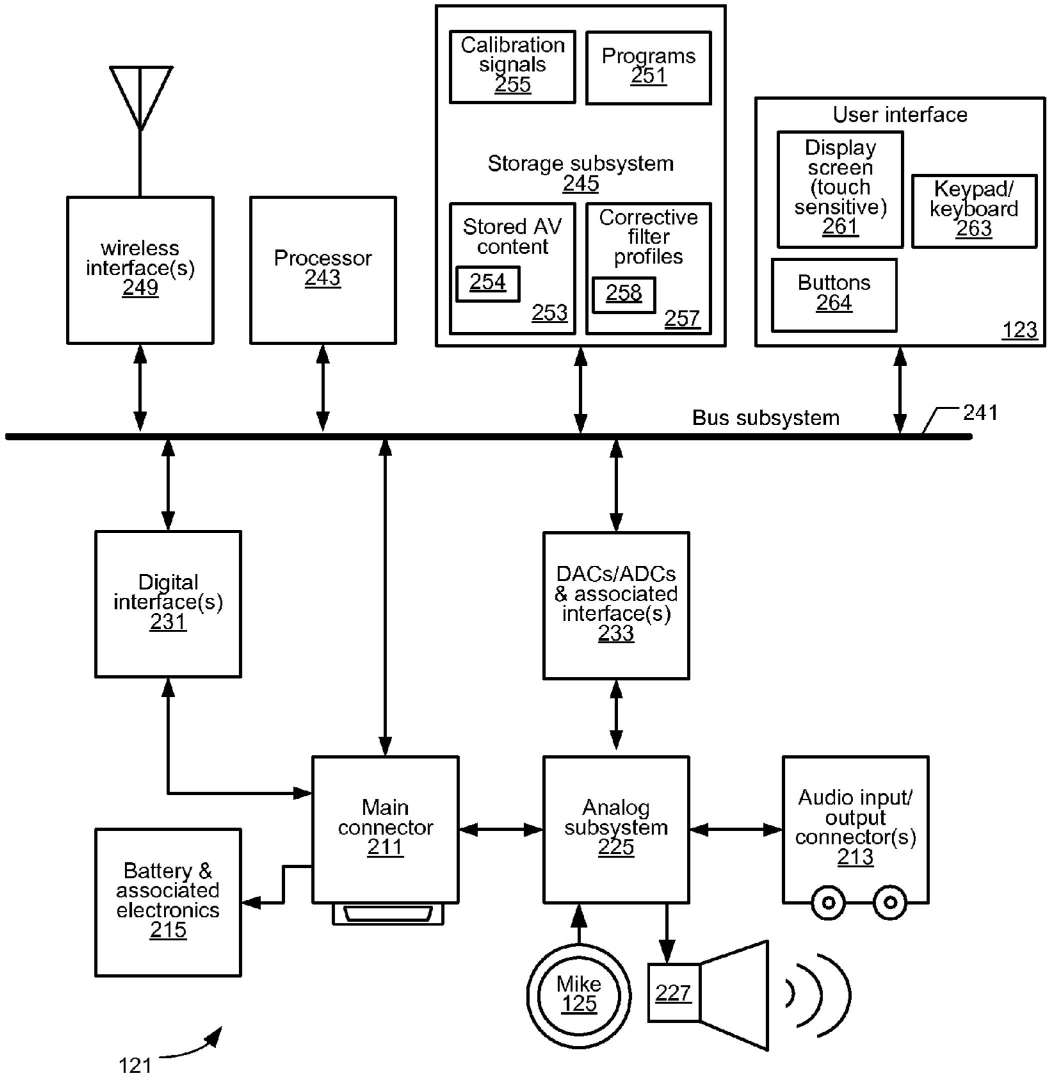
FIG. 2 shows a simplified block diagram of one example embodiment of a portable media device that includes at least one feature of the present invention.

FIG. 2 shows a simplified block diagram of one example embodiment of a portable media device that includes at least one feature of the present invention. It would be clear to one skilled in the art that not all the elements shown in FIG. 2 would be included in all portable media device embodiments, and further, that some portable media device may include additional elements not shown in FIG. 2.

The digital elements of the portable media device 121 include elements that are coupled by a bus subsystem 241, shown purely for the sake of simplicity as a single bus. These digital elements include at least one processor 243, a storage subsystem 245, a user interface 123, at least one digital interface 231 coupled to a main connector 211, and one or more digital-to-analog converters (DACs) to convert digital information such as digitized audio signals to analog audio signals for playback via one or more audio amplifiers in an analog subsystem 225, and one or more analog-to-digital converters (ADCs) to convert an analog audio signal to a digitized analog signal. The DACs and ADCs are shown with their associated interfaces as module 233. The DACs and ADCs 233 are coupled to the analog subsystem 225. The portable media device 121 also includes at least one wireless interface 249 such as, but not limited to, a wireless network interface, a Bluetooth interface, an infrared interface, or the like. One such wireless interface is a common Wi-fi IEEE 802.11 wireless network interface. Some embodiments of the portable media device 121 also include a cellular telephone wireless network interface so that the device can act as a cellular telephone. Some embodiments also include other wireless network interfaces such as a Bluetooth interface.

The portable media device 121 also includes a battery and associated electronics subsystem 215 coupled in one embodiment to the main connector 211.

In some embodiments, the analog subsystem 225 is connected to the main connector 211 so that, for example, analog audio signals are available at the main connector 211. The main connector 211 is also coupled to the bus subsystem 241 and the at least one digital interface 231 so that signals are provided to and obtainable from whatever the main connector 211 is connected to.

The analog subsystem 225 is coupled to a microphone 125, which in this embodiment is built in. Other embodiments are connectable to a microphone 125. This embodiment also includes at least one loudspeaker 227 connected to the analog subsystem 225. A set of at least one input/output connectors 213 is included so that an external set of loudspeakers, e.g., loudspeakers incorporated in headphones, can be connected and also so that different analog audio signals can be input via the analog subsystem 225.

In some embodiments, the user interface 123 includes a display screen 261 operative to display information to a user, one or more buttons 264 to accept input from a user, and a keypad/keyboard 263 also to accept input from a user. In some embodiments, the display screen 261 includes a touch sensitive surface to accept input from the user, and in some such embodiments, at least some of the buttons 264 are so-called soft buttons in that they are generated by causing a particular area of the display screen 261 to display a button, possibly with a message for the user, and such that the user touching the particular area causes an input that is the same as if a hardware button is displayed. Similarly, while a separate module is shown for keypad/keyboard 263, some or all of these elements may comprise soft buttons on the display screen 261.

The storage subsystem 245 includes programs in the form of executable instructions that when executed by the at least one processor 243 cause carrying out of regular functionality of the portable media device 121 and for carrying out aspects of the present invention. Some of the programs 251, for example, provide such functionality when executing as causing displaying and accepting input from buttons 264, including soft buttons displayed in the display screen 261, and in some embodiments, accepting input in the form of multi-touch gestures as are common in 2010. The storage subsystem 245 also is configured to store digital content, shown in FIG. 2 as stored audiovisual (AV) content 253, but which may include only digitally stored audio. The content in the stored content 253 is typically stored as compressed data files, e.g., in the case of audio as AAC or MP3 files, such as audio file 254. The programs 251 also include instructions that when executed cause playback of a digitally stored audio file to form digital signals that are converted to analog form by the DACs in module 233, and amplified by at least one amplifier in the analog subsystem 225. Thus, the portable media device 121 includes a playback subsystem configured to play back a selected audio signal. In the embodiment shown, the playback system is made up of elements of the analog subsystem 225, the DACs of module 233, and instructions within the programs 251 in the storage subsystem 245 that when executed cause playback of audio content that forms the selected audio signal.

As will be described in more detail below, the storage subsystem 245 also is configured to store a plurality of corrective filter profiles, e.g., equalization profiles 257 that include data needed to implement sets of corrective filters. In one embodiment, each corrective filter profile 258 of corrective filter profiles collection 257 provides the data needed to implement a particular set of one or more corrective filters for a particular playback system. Because a corrective filter profile 258 provides the data needed to implement a particular set of one or more corrective filters for a particular playback system, for the sake of simplicity of language, the term (the) corrective filter profile 258 and "(the) data for a (or the) set of one or more corrective filters" will be used synonymously. Having a profile, however, is only one way of implementing a set of one or more corrective filters, hence using the same language is not intended to limit the invention to using a profile.

Thus, the portable media device 121 includes a filter subsystem coupled to the playback subsystem and configured to apply a set of one or more corrective filters to an audio signal during playback of a selected audio signal.

The storage subsystem 245 is made up of several types of storage devices, and include solid state memory and may include magnetic memory, e.g., as a hard disk. Many variations are possible as would be clear to one skilled in the art.

Some of the elements of portable media device 121 may be provided as part of a large integrated circuit. The functionality may be divided between more than one device. Furthermore, there may be one or more discrete components. At least one element's functionality may be provided by executing one or more programs on one or more of the at least one processor 243. The one or more processors 243 may include the functionality of a DSP device, e.g., in the form of a DSP portion of an integrated circuit, or in some embodiments, in the form of a separate DSP device. A general purpose processor may be used instead or in addition. Many such variations are possible. Further details on possible architectures of the portable media device 121 are not provided herein in order not to obscure the inventive aspects.

An Example Playback System

Figure 3:
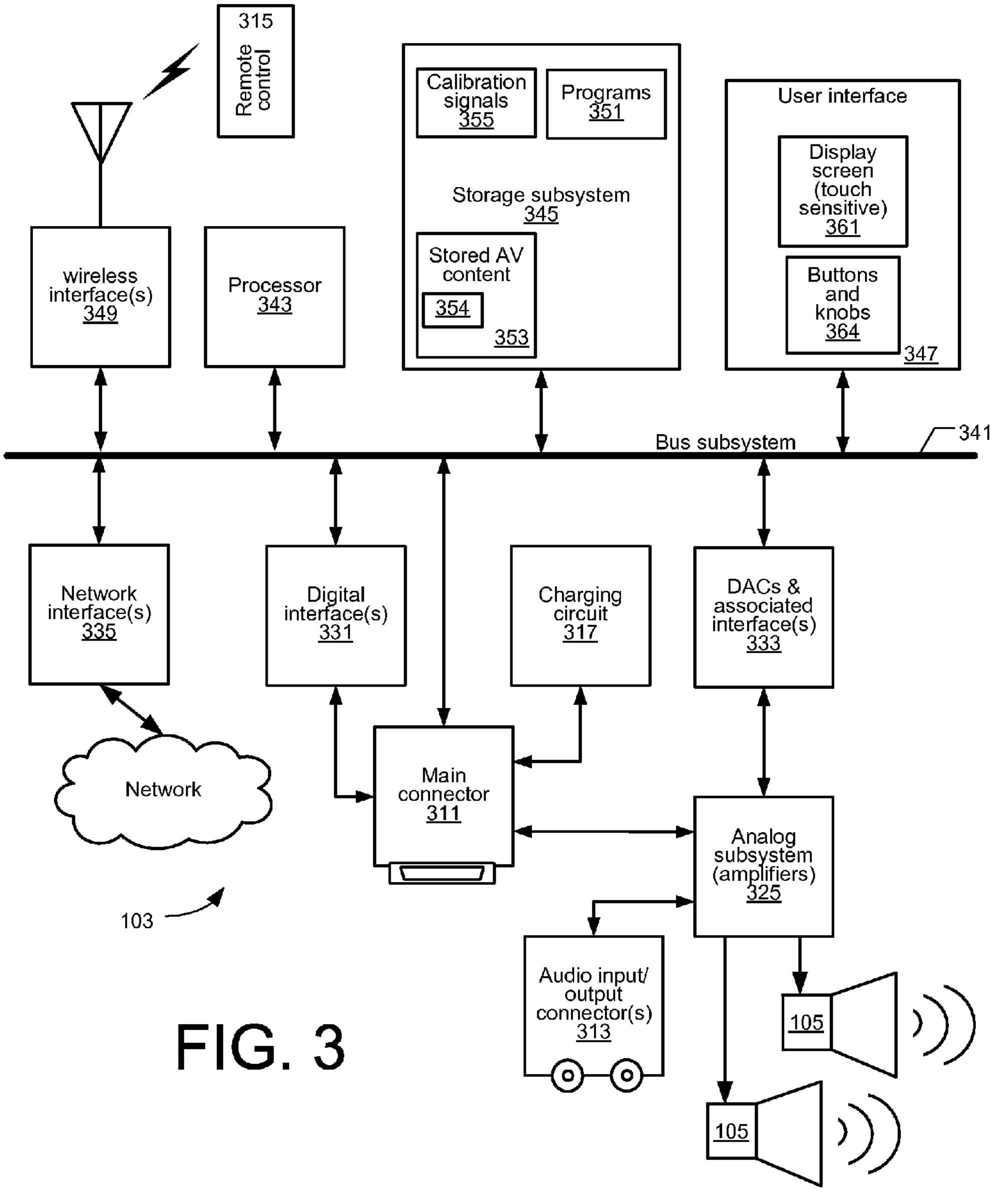
FIG. 3 shows a simplified block diagram of one example embodiment of a playback system to which a portable media device is connectable, and when so connected is used in carry out a feature of the repent invention.

FIG. 3 shows a simplified block diagram of one example embodiment of a playback system 103. The portable media device is connectable to more than one playback system. The playback system shown is one example. It would be clear to one skilled in the art that not all the elements shown in FIG. 3 would be included in all playback system embodiments, and further, that some playback systems may include additional elements not shown in FIG. 3. For example, the playback system of FIG. 3 includes many digital elements, including storage of digital media files, and includes interfaces to connect the playback system to a wireless network and to have a wired network connection. Many playback systems would not have such elements.

The playback system includes a coupling (shown as coupling 113 in FIGS. 1A and 1B) to a portable media device such as media device 121. In the embodiment of FIG. 3, the coupling 113 is in the form of a main connector 311 configured to connect to a portable media device, e.g., device 121. The main connector 311 includes connections that accept analog audio signals from a connected portable media device. Main connector 311 is connected to an analog subsystem 325 that includes one or more audio amplifiers for playback of the audio signals via a coupled set of one or more loudspeakers 105.

A set of at least one input/output connectors 313 is included so that different analog audio signals can be input via the analog subsystem 325. Thus, the analog input connector in 313 can act as the coupling (shown as coupling 113 in FIGS. 1A and 1B) to a portable media device instead of, or in addition to main connector 311. Of course, some embodiments do not include such an additional input, while other embodiments do not include a main connector configured to accept analog input signals. In some embodiments, an output terminal is also included in element 313 so that an external set of loudspeakers, e.g., headphones that include loudspeakers devices can be connected.

In the embodiment shown, control of volume, etc., is achieved via a user interface 347 that in this case includes digital elements. A user interface for a playback system may of course also include one or more analog elements, such as analog volume controls.

The digital elements of the playback system embodiment 103 include elements that are coupled by a bus subsystem 341, shown purely for the sake of simplicity as a single bus. These digital elements include at least one processor 343, a storage subsystem 345, the user interface 347, at least one digital interface 331 coupled to a main connector 311, and one or more digital-to-analog converters (DACs) to convert digital information such as digitized audio signals from AV content stored in the storage subsystem 345 to analog audio signals for playback on the at least one loudspeaker 105 via the one or more audio amplifiers in analog subsystem 325. The DACs are shown with their associated interfaces as module 333 and coupled to the analog subsystem 325.

In some versions, the playback system 103 also includes at least one wireless interface 349 such as, but not limited to a wireless network interface, a Bluetooth interface, an infrared interface, or the like. One such wireless interface is a common Wi-fi IEEE 802.11 wireless network interface. The wireless network interface enables connection to a network, e.g., a home network which in turn may be connected to an external network, e.g., the Internet. Some embodiments of the playback system 103 also include a Bluetooth interface, and an infrared interface configured to accept commands from a remote control device 315.

Some embodiments also include one or more other network interfaces 335 so that the playback system 103 can be connected to a wired network, e.g., a wired home network which in turn may be connected to an external network, e.g., the Internet.

In some embodiments, the main connector is also coupled to a charging circuit 317 configured to supply power to charge a connected portable playback device, and to accept control signals related to the charging.

In some embodiments, the main connector 311 is also coupled to the bus subsystem bus subsystem 341 and the at least one digital interface 331 so that signals are provided to and obtainable from whatever the main connector 311 is connected to.

In some embodiments that include one or more processors 343 and the storage subsystem 345, the storage subsystem 345 includes programs in the form of executable instructions that when executed by the at least one processor 343 cause carrying out of regular functionality of the playback system 103. In some such embodiments, the storage subsystem 345 is also configured to store digital content, shown in FIG. 3 as stored audiovisual (AV) content 353, but which may include only digitally stored audio. The content in the stored content 353 is typically stored as compressed data files, e.g., in the case of audio as AAC or MP3 files, such as audio file 354.

While the present invention is not limited to such embodiments, in some embodiments, a user interface 347 that is digitally driven is included. In an example embodiment, the user interface 347 includes a display screen 361 operative to display information to a user, and one or more buttons and knobs 364 to accept input from a user. In some embodiments, the display screen 361 includes a touch sensitive surface to accept input from the user, and in some such embodiments, at least some of the buttons or knobs 364 are so-called soft buttons in that they are generated by causing a particular area of the display screen 361 to display a button, possibly with a message for the user, and such that the user touching the particular area causes an input that is the same as if a hardware button is displayed. Thus, some of the programs 351, for example, provide such functionality when executing as causing displaying and accepting input from buttons 364, including soft buttons displayed in the display screen 361

The storage subsystem 345 is made up of several types of storage devices, and includes solid state memory and may include magnetic memory, e.g., as a hard disk. Many variations are possible as would be clear to one skilled in the art.

One aspect of embodiments of the invention is playback of one or more calibration signals by the playback system. In some versions, the calibration signals may be input, e.g., via an external connector, or via a wireless or wired connection. In others, calibration signals may be pre-stored in digital form in the storage subsystem. In yet others, the calibration signals may be obtained by connection and then stored in the storage subsystem 355 in digital form for playback. Digitally stored calibration signals are shown as calibration signals 355 in the example embodiment of FIG. 3.

Some of the elements of playback system 103 may be provided as part of a large integrated circuit. The functionality may be divided between more than one device. Furthermore, there may be one or more discrete components. At least one element's functionality may be provided by executing one or more programs on one or more of the at least one processor 343. Many such variations are possible. Further details on possible architectures of the playback system 103 are not provided herein in order not to obscure the inventive aspects.

An inventive aspect of embodiments of the present invention is that a single portable media device may be connected to several different playback devices, or even the one device that may be listened to in different locations. Hence, while only one playback system example has been shown here, those of skill in the art would understand that there are many possible playback devices to which a portable media device may be connected. Some such playback devices are relatively simple, while others are more complex.

The disclosed invention provides mechanisms and methods for applying corrective filtering, e.g., equalizing each of a variety of playback systems to which a portable media device might be attached by applying the corrective filtering directly in the portable media device. The invention is not limited to any particular type of corrective filtering, and equalization is an example of corrective filtering than can be applied as described herein.

Example Methods

Some embodiments include a method of operating a portable media device 121.

The method includes playing back an audio signal on the portable media device 121/playback system combination while the portable media device 121 is coupled to a particular playback system 103, and is in a particular listening arrangement. During the playback, the portable media device applies a particular set of one or more corrective filters selected from a pre-stored collection of data for at least one set of one or more corrective filters.

The data for the collection of one or more sets of corrective filters is pre-stored in or for the portable media device 121. The data for each set of the collection is associated with a corresponding playback system (and listening arrangement). In the example of FIG. 2, the particular set of one or more corrective filters is shown as a profile 258 that includes the data needed to implement the set of filters, e.g., by running one or more programs on at least one of the one of more processors 243.

Note that the term listening arrangement may cover one specific location, or may cover a range of listening locations or any listening location for the particular playback system. For example, the corrective filters may be designed for equalizing listening to a playback system having particular loudspeakers 105, and while possible being determined for one specific listener location, may be usable for a range of listening locations. Furthermore, one may make measurements (recording) from a plurality of locations to determine a single averaged correction filter for a range of locations. Hence the term "listening arrangement" should not be taken to imply only a single listening location using the particular playback system, i.e., not applicable to other locations using the particular playback system. Firstly, a corrective filter determined from one or more recordings from a single location may be used for a range of locations, and secondly, in some calibration method embodiments, one can make measurements from several locations in order to determine a single set of "averages" corrective filters suitable for a range of locations.

An Example Calibration Method

Figure 4:
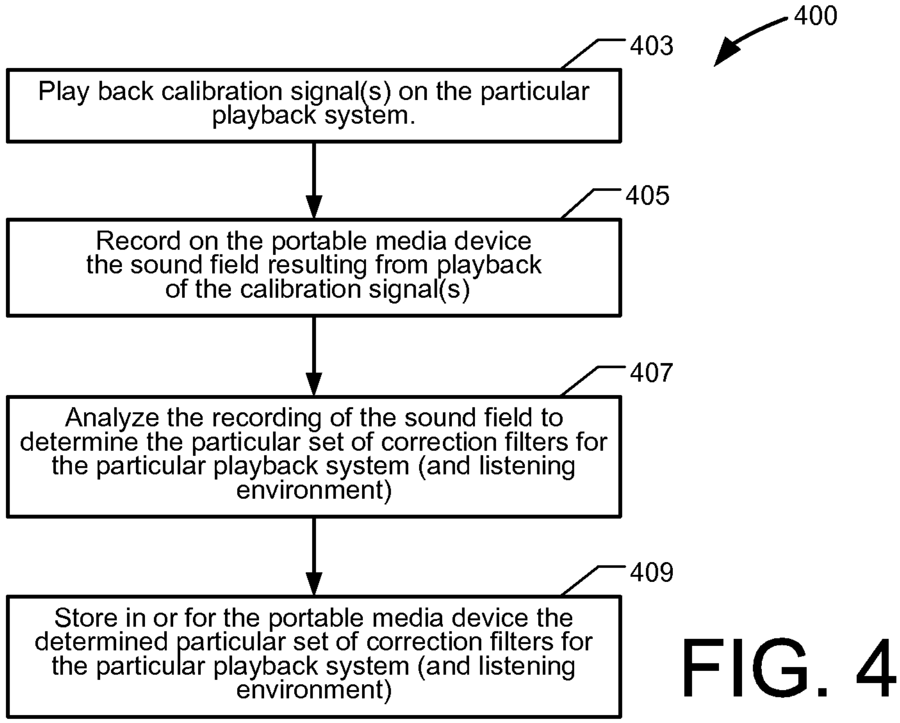
FIG. 4 shows a simplified flowchart of an embodiment of a calibration method.

The particular set of one or more corrective filters is determined by a calibration process. FIG. 4 shows a simplified flowchart of an embodiment of a calibration method 400. The method 400 includes in 403 playing back one or more predefined calibration signals 111 on the particular playback system 103, and, during the playback, in 405, recording on the portable playback device 121 the sound field resulting from one or more pre-defined calibration signals 111 being played back on the particular playback system 103. The recording uses a microphone 125 built in or connected to the portable media device 121 while the microphone 125 is at one or more desired listener locations that are part of the listening arrangement. As noted before, there may be more than one location associated with a listening arrangement, and the recordings may include recordings taken at more than one location. The method includes in 407 analyzing the recording of the sound field to determine the particular set of one or more corrective filters at least to equalize for the particular playback system (and possibly also for the listening environment), and in 409, storing the particular set of one or more corrective filters in or for the portable media device for the particular playback system (and listening environment).

In one set of embodiments, the storing is in the portable media device 121. In another set of embodiments, the storing, while possibly temporarily, is on the portable media device 121, is then or later stored remotely, e.g., on a remote storage system on a remote server, for the portable media device 121. Hence the storing being "in or for" the portable media device 121 for the particular playback system 103 (and listening environment).

In one embodiment, the portable media device 121 includes a user interface that presents a 'calibrate' button in buttons 264, or some other function to enable a user to indicate to carry out the recording, analyzing, and storing of the particular set of one or more corrective filters. The calibration method includes receiving on the user interface an indication from a user to carry out the recording, analyzing, and storing of the particular set of one or more corrective filters, and carrying these steps out in response to such receiving.

Also, in some embodiments in which the portable media device 121 contains its own microphone, embodiments of the method provide an extremely easy-to-use, self-contained form factor for calibration. A user can simply hit the 'calibrate' button in buttons 264 and hold the portable media device 121 in a listening position, e.g., in front of the playback system speakers 105.

The calibration signals in one embodiment are pre-stored in the portable media device portable media device 121, e.g., as calibration signals 255 in the storage subsystem 245 of the portable media device 121, and loaded into a playback system 103 for storage within the playback system. In other embodiments, the portable media device 121 is connected to the playback system by wire or wirelessly from the listening position, and the calibration signal is sent to the playback system 103 and played back while the resulting sound field is recorded for analysis to determined the particular set of one or more corrective filters for the portable media device 121 and playback system combination. In yet another embodiment, the calibration signal or signals are provided for playback on the playback system by some other mechanism, e.g., preloaded in the playback system, or provided in real time by another source. The invention is not limited to any particular way of providing the calibration signal(s) to the playback system. The invention is also not limited to the manner any calibration signal is provided to the playback system, e.g., digital form or as an analog signal.

Figure 5:
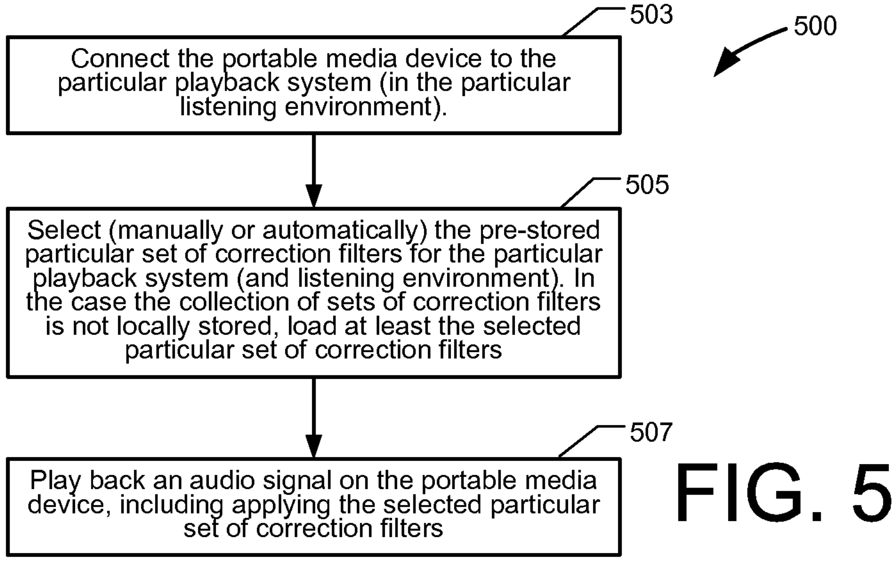
FIG. 5 shows a simplified flowchart of a method of operating a portable media device for which or on which is stored the data for a collection of sets of corrective filters.

An Example Method of Operating a Portable Media Device,

FIG. 5 shows a simplified flowchart of a method 500 of operating a portable media device, e.g., device 121 for which or on which is stored the data for a collection of sets of corrective filters, e.g., in the form of the data for implementing the corrective filters, each set associated with a corresponding playback system (and listening arrangement).

The method includes in 503 connecting the portable media device 121 to the particular playback system 103 in a particular listening environment. The method further includes in 505 selecting (manually or automatically) the pre-stored particular set of one or more corrective filters at least to equalize for the particular playback system 103 (and possibly also for the listening environment). In the case the data for collection of sets of corrective filters is not locally stored, 505 includes loading at least the selected particular set of one or more corrective filters. This might occur separately, and at a different time from the selecting. 507 includes playing back an audio signal on the portable media device 121 while the portable media device 121 is connected to the particular playback system 103. The playing back includes applying the particular set of one or more corrective filters.

Selecting the Set of One or More Corrective Filters

In the case of manual selection in 505, in some embodiments, the portable media device includes a user interface 123 that includes, e.g., as buttons 264, indication to the user of one or more pre-stored sets of corrective filters. The method includes the media portable device 121 receiving, e.g., via the user interface 123, an indication from a user to use a particular set of one or more corrective filters for playback.

Some embodiments provide for automatic selection of the set of one or more corrective filters. In some embodiments, for example, for some so-called "docking speakers" playback systems, the playback system may be configured to provide an indication to an attached portable media device, e.g., providing signals via the main connector that are indicative of the type and/or model of playback device. The method 500, in some embodiments, includes the portable media device receiving an indication from the particular playback system indicating that particular portable media device is coupled to the particular playback system. Some embodiments of the portable media device are configured such that, responsive to the indication, the method includes automatically selecting the particular set of one or more corrective filters associated with the particular portable media device for playback.

Furthermore, some embodiments of the portable media devices have pre-defined sets of corrective filters that are pre-defined for particular classes of playback systems. For example, simple "docking speakers" playback systems may form a class, television receivers may form a class, home stereo receivers with connected speakers may form a class, home receivers with a connected subwoofer may form a class, automotive playback systems in an automobile may form a class, and so forth. In some embodiments, at least one of the sets of corrective filters is a default set predefined for a class of playback systems.

Types of Corrective Filters

The invention is not limited to any particular type of corrective filters or how such corrective filters are implemented or specified. In the near future, portable media devices may have enough processing power to implement more sophisticated correcting filters than a set of multi-band equalizing filters. Some possible types of corrective filters are described below. These are provided as examples only and not to limit the invention to any particular types of corrective filters.

Multi-Band Equalizing Filters

Some embodiments of the set of one or more corrective filters include a set of multi-band equalizing filters. The frequency range of listening is partitioned into a set of frequency bands, and each filter of the set of multi-band equalizing filters sets a relative gain for one of the frequency bands. Such multi-band equalizing filters are well known in the art. The number of frequency bands for any particular portable media device can be fixed, or settable, and is typically a relatively small number, e.g., 6, 9, or 12. There are many ways of implementing such filters, and one embodiment uses digital signal processing methods implemented by a program in programs 251 executing on the processor 243, e.g., on a DSP element. That is, applying the particular set of one or more corrective filters when the portable media device is coupled to a particular playback system includes digitally processing digital signals on at least one of the one or more processors of the portable media device. In some embodiments, the multi-band equalizing filters are implanted as a set of digital parametric filters at respective frequency bands. Such parametric filters are defined by a set of parameters. In one embodiment, each set of parameters is stored as a corrective filter profile 258 of corrective filter profiles collection 257 and is usable to implement a particular set of one or more corrective filters for a particular playback system.

In alternate embodiments, playback circuitry in the portable media device 121 implements a variable set of gain controls according to respective gain parameters for a predefined number of frequency bands. A set of gain settings is stored as a corrective filter profile 258 of corrective filter profiles collection 257 and is usable to implement a particular set of one or more corrective filters for a particular playback system.

Multi-Channel Audio

More sophisticated corrective filters are applicable to playback via a playback system that includes more than two loudspeakers, e.g., a playback system that provides surround sound as is common today in home theater receivers. The correcting filters for such playback systems can include more sophisticated settings that provide relative gains to the signals generated by the portable media device 121 for the different loudspeakers 105 in the playback system.

Perceptual Domain Processing

Recently, perceptual domain processing has been invented that takes into account the variation in the perception of audio depending on the reproduction level of the audio signal. A time sampled audio signal denoted is pre-processed to generate a time-varying spectrum indicating a signal level within a plurality of frequency bands (critical bands), e.g., 40 bands, each denoted by a band number, and varying over time blocks. The time-varying spectrum of the audio signal may be generated in a number of ways, but advantageously the bands are spaced to simulate the frequency resolution of human hearing. A quantity called an excitation signal is computed that approximates the distribution of energy along the basilar membrane of the inner ear of a human at a critical frequency band during a time block. While other transforms, such as the modified discrete cosine transform (MDCT) also may be used, the perceptual domain excitation may be achieved efficiently by computing a running Short-Time Discrete Fourier Transform (STDFT) of the audio signal using the frequency response of a filter simulating the transmission of audio through the outer and inner ear of a human and a selected set of bandpass filters, e.g., bandpass filters chosen to mimic the critical band filtering observed along the basilar membrane in the human ear at each critical frequency band of interest. Example embodiments use a set of filters with a spacing of 1 ERB, resulting in a total of 40 bands.

Distortion Reducing Multi-Band Compressor with Timbre Preservation

In playback devices, audio playback may be perceptibly distorted, and often acutely distorted, as playback level is increased during playback, this distortion is oftentimes frequency dependent for a playback device. One form of corrective filtering is applying multi-band compression to the audio signal prior to playback to reduce distortion and attempt to maximize playback level. One simple method includes specifying a distortion threshold is specified for each frequency band of the compressor. The compressor independently applies differing gain values to each frequency band to ensure an output signal does not exceed any of the corresponding distortion thresholds.

An improved set of corrective filters includes timbre preservation in a multi-band compressor. Timbre preservation is achieved by determining a time-varying threshold in each of a plurality frequency bands as a function of (i) a respective fixed threshold for the frequency band and, at least in part, (ii) an audio signal level (whether digital or analog audio signal) in a second frequency band and (iii) a fixed threshold in the second frequency band. Consequently, each time-varying threshold is input signal adaptive. If a particular frequency band receives significant gain reduction due to being above its fixed threshold (or alternatively, approaching the fixed threshold), then a time-varying threshold of one or more other frequency bands are also decreased to receive some gain reduction.

One example embodiment of applying such timbre preserving multi-band compressor corrective filtering includes providing or determining a fixed threshold for a first frequency band, and determining a first level of an audio signal within the first frequency band. The first level can be less than the fixed threshold. The method further includes determining a second level of the audio signal for a second frequency band is also determined, and computing a time-varying threshold for the first frequency band using the second level. The time-varying threshold us less than the fixed threshold. The method includes attenuating the audio signal within the first frequency band to be equal to or less than the time-varying threshold or, alternatively, increasingly attenuating the audio signal within the first frequency band as approaching the time-varying threshold. The time-varying threshold can be computed from an average difference of the audio input signal in each frequency band and its respective fixed threshold. Optionally, a second fixed threshold for the second frequency band can be further determined. The second level of the audio signal can exceed the second fixed threshold, resulting in attenuation of the audio signal within the second frequency band to the second fixed threshold. A set of corrective filters to implement such a method includes a multi-band filterbank, compression function elements, and at least one timbre preservation element. Each compression function element can be dedicated to a frequency band. The timbre preservation element is coupled to the multi-band filterbank and the compression function elements. The timbre preservation element receives a fixed threshold for each frequency band and provides a time-varying threshold for each frequency band. The time-varying threshold for a frequency band is partially determined by a level of the audio signal outside the frequency band.

For more details of such corrective filtering, see U.S. Provisional Patent Application 61/315,172 filed Mar. 18, 2010, titled TECHNIQUES FOR DISTORTION REDUCING MULTI-BAND COMPRESSOR WITH TIMBRE PRESERVATION, the contents of which are incorporated herein by reference, and a copy of which is attached hereto as APPENDIX A.

Inverse Filtering to Match a Target Response

Another form of corrective filtering applies an inverse filter to alter the playback system's loudspeaker's frequency response in an effort to match the inverse-filtered loudspeaker output to a target frequency response. As in perceptually based processing described above, the methods are applied to "critical frequency bands"—frequency bands of a full frequency range that are determined in accordance with perceptually motivated considerations. Typically, critical frequency bands that partition an audible frequency range have width that increases with frequency across the audible frequency range. The methods use "critically banded" data, implying that that the full frequency range includes critical frequency bands, and that the data comprises subsets, each of the subsets consisting of data indicative of audio content in a different one of the critical frequency bands.

The target frequency response may be flat or may have some other predetermined shape.

In some embodiments, the calibration method includes determining an inverse filter for a loudspeaker of the playback system. The calibration includes measuring the impulse response of the loudspeaker at each of a number of different spatial locations in the listening arrangement, time-aligning and averaging the measured impulse responses to determine an averaged impulse response, and using critical frequency band smoothing to determine the inverse filter from the averaged impulse response and a target frequency response. For example, critical frequency band smoothing may be applied to the averaged impulse response and optionally also to the target frequency response during determination of the inverse filter, or may be applied to determine the target frequency response. Measurement of the impulse response at multiple spatial locations can ensure that the speaker's frequency response is determined for a variety of listening locations. In some embodiments, the time-aligning of the measured impulse responses is performed using real cepstrum and minimum phase reconstruction techniques.

In some embodiments, the averaged impulse response is converted to the frequency domain via the discrete Fourier transform (DFT) or another time domain-to-frequency domain transform. The resulting frequency components are indicative of the measured averaged impulse response. These frequency components, in each of the transform bins are combined into frequency domain data in a smaller number of critical frequency bands, e.g., 20 bands or 40 bands, as for other perceptual domain processing. The banding of the averaged impulse response data into critically banded data is designed to mimics the frequency resolution of the human auditory system. The banding is typically performed by weighting the frequency components in the transform frequency bins by applying appropriate critical banding filters thereto and generating a frequency component for each of the critical frequency bands by summing the weighted data for the band. Typically, these filters exhibit an approximately rounded exponential shape and are spaced uniformly on the Equivalent Rectangular Bandwidth (ERB) scale. The spacing and overlap in frequency of the critical frequency bands provide a degree of regularization of the measured impulse response that is commensurate with the capabilities of the human auditory system. Application of the critical band filters is an example of critical band smoothing (the critical band filters typically smooth out irregularities of the impulse response that are not perceptually relevant so that the determined inverse filter does not need to spend resources correcting these details).

Values for determining the inverse filter are determined from the target response and averaged impulse response, e.g., from smoothed versions thereof, in frequency windows, e.g., critical frequency bands. The critically banded impulse response data are used to find an inverse filter which achieves a desired target response. In some embodiments, in order to maintain equal loudness when using the inverse filter, the inverse filter is preferably normalized against a reference signal, e.g., pink noise, whose spectrum is representative of common sounds.

In come embodiments, inverse filter coefficients are directly calculated in the time domain.

The resulting inverse filter forms the set of corrective filters applied to the signal in the playback system as described herein.

For more details of such corrective filtering, see International Patent Application No. PCT/US2010/020846 filed Jan. 13, 2010, titled METHOD FOR DETERMINING INVERSE FILTER FROM CRITICALLY BANDED IMPULSE RESPONSE DATA, the contents of which are incorporated herein by reference, and a copy of which is attached hereto as APPENDIX B.

Storing the Data of the Sets of Corrective Filters

In some embodiments, the set of parameters for implementing a set of one or more corrective filters is stored on or for the portable media device 121 as part of a collection of sets. In some embodiments, the collection is stored in the form of a database. Each entry is a set of parameters for implementing a set of one or more corrective filters for a particular playback system, and includes an indicator that the particular set of one or more corrective filters is associated with the particular playback system. Thus, step 409 of FIG. 4 for such embodiments includes storing an indicator that the particular set of one or more corrective filters is associated with the particular playback system.

In some embodiments, the data for the collection of one or more sets of corrective filters, e.g., the database, is stored in a storage subsystem included in the portable media device. Thus, as shown in FIG. 2, in some embodiments, the storage subsystem 245 includes corrective filter profiles 257, and one such profile 258 is shown.

Figure 6:
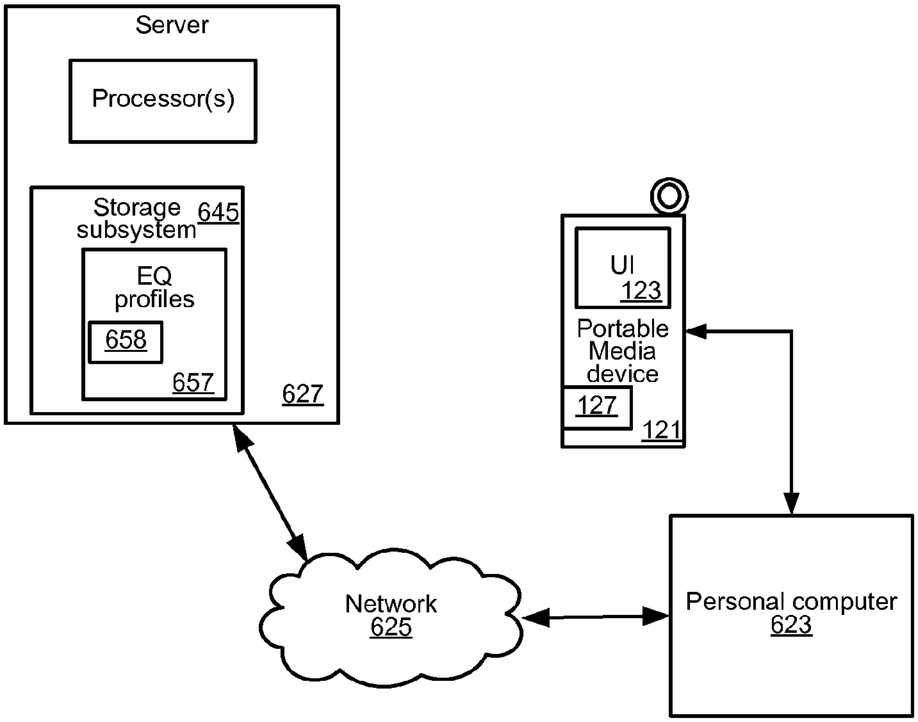
FIG. 6 shows a simplified block diagram of one arrangement according to some embodiments of the invention that include remote storage of the data for the collection of one or more sets of corrective filters.

In other embodiments, the data for the collection of one or more sets of corrective filters is stored remotely from the portable media device. FIG. 6 shows a simplified block diagram of one arrangement according to some embodiments of the invention that include remote storage of the data for the collection of one or more sets of corrective filters. During step 409, the storing initially may be temporarily in the storage device in the portable media device 121, and then stored remotely, e.g., stored remotely when the portable media device is connected to a personal computer 623 which is coupled to a network 625, which can be any private or public network, even the Internet. A server system 627 is also connected to the network 625. The server system 627 includes one or more processors and a storage subsystem 645. The storage subsystem 645 is configured to store the data for one of more collections of sets of corrective filters, each such collection being associated with a particular portable media device 121 or a particular user or both a particular user and portable media device. In the example shown, the data for one collection 657 of one or more sets of corrective filters is shown. The data for one set 658 is shown. The data of the collections is in some embodiments in the form of a database. The data for each set of one or more corrective filters is stored in the database as an entry we call a corrective filter profile that includes the parameters needed to implement the corrective filters. When the portable media device 121 is connected to the personal computer 623 connected via the network to the server 627, the particular sets of correction filter in temporary storage in the portable media device 121 is sent for storage in the storage subsystem 645 of the server 627. Similarly, when the portable media device 121 is connected to the personal computer 623 connected via the network to the server 627, one or more sets of corrective filters stored in the storage subsystem 645, e.g., as corrective filter profiles, can be loaded into the portable media device 121 for use in playback. Thus, for example, a particular set of correction filters for a particular playback system can be loaded from remote storage to the portable media device 121 for use in playback while the portable media device is coupled to the particular playback system.

Analysis

Process action 405 includes recording on the portable media device 121 the sound field resulting from playback on the playback system 103 of the calibration signal. Process action 407 includes analyzing the recording to determine the particular set of one or more corrective filters at least to equalize for the particular playback system (and possibly also for the listening environment).

The invention is not limited to any particular type of calibration signal(s) or any particular analysis method. In one embodiment the calibration signal is made up of a sum of distinct frequency tones of known amplitudes at a pre-defined number of distinct frequencies. In one embodiment, the center frequencies are the center frequencies of the corrective filters used in the portable media device 121. The center frequencies of graphic equalizers are often distributed logarithmically, e.g., in octaves. In some embodiment, the center frequencies of the components of the test signal are therefore also spread logarithmically. In some embodiment, the amplitudes of the distinct frequency components of the test signal are equal, while in other embodiments, the amplitudes vary according to the inverse of the frequency.

The analysis process 407 includes determining the amplitudes at the distinct frequencies of the recorded recording in order to determine the gains at the frequencies that would cause equalize the response. The gains at the center frequency forms the data of the particular set of one or more corrective filters, e.g., the corrective filter profile stored for or in the portable media device 121 for the particular playback system and listening environment.

One alternate embodiment uses a noise signal for the calibration signal. In one embodiment, the calibration signal is a white noise signal, i.e., a noise signal that has the same distribution of power for all frequencies. In another embodiment, the calibration signal is a pink noise signal, i.e., a noise signal that has a distribution of power that is proportional to the reciprocal of the frequency. In some embodiments in which a noise signal is used as the calibration signal, the noise signal is generated using digital synthesis methods that use pseudorandom noise.

In some embodiments in which a noise signal is used as the calibration signal, the analysis 407 includes determining the spectrum of the recorded sound field, e.g., by carrying out a discrete Fourier transform (DFT), e.g., carried out as a fast Fourier transform (FFT), using method well known to those skilled in the art.

From the results of the transform, and a target reference spectrum for the signals after processing by the set of one or more corrective filters, the data are determined and stored for the particular set of one or more corrective filters that modify the determined spectrum of the recorded sound field to match the target reference spectrum for the particular playback system and listening environment.

While digital methods have been described above for the analysis 407, in alternate embodiments, some or all of the analysis may be carried out by analog circuitry. The recorded signal is divided into frequency bands, e.g., by a set of bandpass filters, and level measurement circuitry is used to determine signals indicative of the signal powers in the frequency bands. These data values may then be digitized, and a set of gains for the frequency bands determined as the data to store for the set of one or more corrective filters for the particular playback system and listening environment.

Thus have been described methods and apparatuses. In some embodiments, calibration signals are played back on a playback system. Using either a built-in or attached microphone, the resulting sound field is recorded on a portable media device. The recorded sound field is analyzed and a set of one or more corrective filters for the playback system is computed. Data for the set of one or more corrective filters is stored on or for portable media device and associated with said playback system. Thus the data for a collection of sets of corrective filters is stored. The stored data for a particular set can then be recalled and the particular set of one or more corrective filters applied to any audio being played from the portable media device when it is attached to the corresponding playback system. Because embodiments of the invention include applying the equalization in the portable media device, such embodiments provide the benefits of room equalization to audio playback systems which do not contain such a feature. Also, when the portable media device contains its own microphone, some embodiments of invention provide an extremely easy-to-use, self-contained form factor for calibration. A user simply hits a calibrate button and holds the portable media device in a listening location in front of the playback system's loudspeakers.

In the context of this document, the term "wireless" and its derivatives may be used to describe circuits, devices, systems, methods, techniques, communications channels, etc., that may communicate data through the use of modulated electromagnetic radiation through a non-solid medium.

Unless specifically stated otherwise, as apparent from the following description, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

In some embodiments, a computer-readable storage medium is configured with, e.g., encoded with instructions stored therein that when executed by one or more processors of a processing system such as a digital signal processing device or subsystem that includes at least one processor element and a storage subsystem, cause carrying out a method as described herein.

The methodologies described herein are, in some embodiments, performable by one or more processors that accept logic, instructions encoded on one or more computer-readable media. When executed by one or more of the processors, the instructions cause carrying out at least one of the methods described herein. Any processor capable of executing a set of instructions (sequential or otherwise) that specify actions to be taken are included. Thus, one example is a typical processing system that includes one or more processors. Each processor may include one or more of a CPU or similar element, a graphics processing unit (GPU), and/or a programmable DSP unit. The processing system further includes a storage subsystem with at least one storage medium, which may include memory embedded in a semiconductor device, or a separate memory subsystem including main RAM and/or a static RAM, and/or ROM, and also cache memory. The storage subsystem may further include one or more other storage devices, such as magnetic and/or optical and/or further solid state storage devices. A bus subsystem may be included for communicating between the components. The processing system further may be a distributed processing system with processors coupled by a network, e.g., via network interface devices or wireless network interface devices. If the processing system requires a display, such a display may be included, e.g., a liquid crystal display (LCD), organic light emitting display (OLED), or a cathode ray tube (CRT) display. If manual data entry is required, the processing system also includes an input device such as one or more of an alphanumeric input unit such as a keyboard, a pointing control device such as a mouse, and so forth. The term storage device, storage subsystem, or memory unit as used herein, if clear from the context and unless explicitly stated otherwise, also encompasses a storage system such as a disk drive unit. The processing system in some configurations may include a sound output device, and a network interface device.

The storage subsystem thus includes a computer-readable storage medium that is configured with, e.g., encoded with instructions, e.g., logic, e.g., software that when executed by one or more processors, causes carrying out one of more of the method steps described herein. The software may reside in a hard disk, or may also reside, completely or at least partially, within the RAM and/or within the processor during execution thereof by the computer system. Thus, the memory and the processor also constitute a computer-readable medium on which are encoded instructions.

Furthermore, a computer-readable storage medium may form a computer program product, or be included in a computer program product.

In alternative embodiments, the one or more processors operate as a standalone device or may be connected, e.g., networked to other processor(s), in a networked deployment, wherein the one or more processors may operate in the capacity of a server or of a client machine in server-client network environment, or as a peer machine in a peer-to-peer or distributed network environment. The term processing system encompasses all such possibilities, unless explicitly excluded herein. The one or more processors may form a personal computer (PC), a portable media device, a media playback system, a tablet PC, a set-top box (STB), a Personal Digital Assistant (PDA), a game machine, a cellular telephone, a Web appliance, a network router, a switch or a bridge, or any machine capable of executing a set of instructions (sequential or otherwise) that specify actions to be taken by that machine.

Note that while some diagram(s) only show(s) a single processor and a single storage subsystem, e.g., a single memory that stores the logic including instructions, those skilled in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a non-transitory computer-readable medium configured with a set of instructions, e.g., a computer program that when executed on one or more processors, e.g., one or more processors that are part of a portable media device, cause carrying out of method steps. Some embodiments are in the form of the logic itself. A non-transitory computer-readable medium is any computer-readable medium that is statutory subject matter under the patent laws applicable to this disclosure, including Section 101 of Title 35 of the United States Code. A non-transitory computer-readable medium is for example any computer-readable medium that is not specifically a transitory propagated signal or a transitory carrier wave or some other transitory transmission medium. The term "non-transitory computer-readable medium" thus covers any tangible computer-readable storage medium. Thus, as will be appreciated by those skilled in the art, embodiments of the present invention may be embodied as a method, an apparatus such as a special purpose apparatus, an apparatus such as a data processing system, logic, e.g., embodied in a computer-readable storage medium, or a computer-readable storage medium that is encoded with instructions, e.g., a computer-readable storage medium configured as a computer program product. The computer-readable medium is configured with a set of instructions that when executed by one or more processors cause carrying out method steps. Accordingly, aspects of the present invention may take the form of a method, an entirely hardware embodiment, an entirely software embodiment or an embodiment combining software and hardware aspects. Furthermore, the present invention may take the form of program logic, e.g., in a computer readable medium, e.g., a computer program on a computer-readable storage medium, or the computer readable medium configured with computer-readable program code, e.g., a computer program product.

While the computer readable medium is shown in an example embodiment to be a single medium, the term "medium" should be taken to include a single medium or multiple media (e.g., several memories, a centralized or distributed database, and/or associated caches and servers) that store the one or more sets of instructions. A computer readable medium may take many forms, including but not limited to non-volatile media and volatile media. Non-volatile media includes, for example, optical, magnetic disks, and magneto-optical disks. Volatile media includes dynamic memory, such as main memory.

It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill skilled in the art from this disclosure, in one or more embodiments.

Similarly, it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All U.S. patents, U.S. patent applications, and International (PCT) patent applications designating the United States cited herein are hereby incorporated by reference. In the case the Patent Rules or Statutes do not permit incorporation by reference of material that itself incorporates information by reference, the incorporation by reference of the material herein excludes any information incorporated by reference in such incorporated by reference material, unless such information is explicitly incorporated herein by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting of only elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method of operating a portable media device that includes an output, the method comprising:

carrying out a calibration method for at least a first listening arrangement of a collection of one or more listening arrangements for playback using the portable media device, the portable media device including a filter subsystem, the calibration method for the first listening arrangement comprising pre-storing filter data on or for the portable media device data, the filter data being for the filter subsystem to implement a first set of one or more corrective filters corresponding to the first listening arrangement of the collection, wherein each listening arrangement of the collection comprises the portable media device and a corresponding playback system that has an input, an amplifier, and a loudspeaker arrangement of at least one loudspeaker, the corresponding playback system being separate and distinct from the portable media device, the corresponding playback system's input being operatively coupleable to the portable media device's output, wherein when the portable media device's output is coupled to the corresponding playback system's input, when an audio signal is being played back on the portable media device, and when the corresponding playback system is in operation, the audio signal is reproduced in any of a plurality of listening locations in said each listening arrangement, such that the portable media device has pre-stored stored thereon or therefor filter data corresponding to each listening arrangement for which the calibration method is carried out, the filter data implementing a corresponding set of one or more corrective filters using the filter subsystem of the media playback device, such that while the portable media device's output is coupled to the input of a corresponding playback system of a listening arrangement of the collection for which the calibration method has been carried out, and while an audio signal is played back on the portable media device via the corresponding playback system of said listening arrangement, the filter subsystem of the portable media device uses the pre-stored data to apply the set of one or more corrective filters corresponding to the listening arrangement, in order that a listener at a listening location of said listening arrangement listens to the audio signal after correction for the listening arrangement according to the set of one or more corrective filters, without requiring the corresponding playback system of said listening arrangement to have the capability of carrying out said correction for the listening arrangement, the calibration method comprising, for the first listening arrangement that includes the portable media device and the first playback system:

(a) recording on the portable media device a sound field resulting from one or more calibration signals of known or determinable characteristics being played back on the portable media device while the output of the portable media device is coupled to the input of the first playback system, the first playback system comprising a first amplifier and a first loudspeaker arrangement of at least one loudspeaker, the recording using a microphone built in or connected to the portable media device while the microphone is at one or more listener locations of the first listening arrangement;

(b) calculating the first set of one or more corrective filters using the recorded sound field, the calculated first set being at least to equalize for playback from the portable media device via the first playback system in the first listening arrangement, the calculating being carried out on the portable media device or on a remote processing system coupled to the portable media device, such that none of the calculating is required to be carried out in the first playback system; and (c) carrying out the pre-storing of the filter data for the calculated first set of one or more corrective filters for the first listening arrangement that includes the first playback system.

2. The method as recited in claim 1, wherein the collection includes a plurality of sets of corrective filters, and wherein at least one of the collection of sets of corrective filters is a default set predefined for a class of listening arrangements with respective playback systems.

3. The method as recited in claim 1, wherein the pre-stored filter data for the one or more sets of corrective filters are stored in a storage subsystem included in the portable media device.

4. The method as recited in claim 1, wherein the pre-storing in or for the portable media device of the filter data for the calculated first set of one or more corrective filters includes pre-storing an indicator that the first set of one or more corrective filters is associated with the first listening arrangement that includes the first playback system.

5. The method as recited in claim 1, wherein the portable media device includes a user interface, and wherein the calibration method for the first listening arrangement includes receiving on the user interface an indication from a user to carry out the recording, calculating, and pre-storing steps of the calibration method.

6. The method as recited in claim 1, wherein portable media device is coupled by a network to a remote processing system, and wherein the calculating the first set includes:

sending the recorded sound field or data related thereto to the remote processing system, calculating the first set in the remote processing system, and receiving the calculated first set or the data therefor via the network from the remote processing system.

7. The method as recited in claim 1, wherein the calculating of the first set is carried out by one or more processors included in the portable media device.

8. The method as recited in claim 1, wherein the pre-storing of the filter data for the first set of one or more corrective filters is into a storage subsystem remote from the portable media device, such that the data of the first set are loaded into the portable media device when or before the portable media device is coupled to the first playback system in the first listening arrangement.

9. The method as recited in claim 1, wherein the portable media device is part of a portable telephone device that is capable of playback of media signals including audio signals.

10. A non-transitory computer-readable medium with instructions stored thereon that when executed by one or more processors included in a portable media device that includes a filter subsystem, cause carrying out a method of operating the portable media device comprising:

carrying out a calibration method for at least a first listening arrangement of a collection of one or more listening arrangements for playback using the portable media device, the portable media device including a filter subsystem, the calibration method for the first listening arrangement comprising pre-storing filter data on or for the portable media device data, the filter data being for the filter subsystem to implement a first set of one or more corrective filters corresponding to the first listening arrangement of the collection, wherein each listening arrangement of the collection comprises the portable media device and a corresponding playback system that has an input, an amplifier, and a loudspeaker arrangement of at least one loudspeaker, the corresponding playback system being separate and distinct from the portable media device, the corresponding playback system's input being operatively coupleable to the portable media device's output, wherein when the portable media device's output is coupled to the corresponding playback system's input, when an audio signal is being played back on the portable media device, and when the corresponding playback system is in operation, the audio signal is reproduced in any of a plurality of listening locations in said each listening arrangement, such that the portable media device has pre-stored stored thereon or therefor filter data corresponding to each listening arrangement for which the calibration method is carried out, the filter data implementing a corresponding set of one or more corrective filters using the filter subsystem of the media playback device, such that while the portable media device's output is coupled to the input of a corresponding playback system of a listening arrangement of the collection for which the calibration method has been carried out, and while an audio signal is played back on the portable media device via the corresponding playback system of said listening arrangement, the filter subsystem of the portable media device uses the pre-stored data to apply the set of one or more corrective filters corresponding to the listening arrangement, in order that a listener at a listening location of said listening arrangement listens to the audio signal after correction for the listening arrangement according to the set of one or more corrective filters, without requiring the corresponding playback system of said listening arrangement to have the capability of carrying out said correction for the listening arrangement, the calibration method comprising, for the first listening arrangement that includes the portable media device and the first playback system:

(a) recording on the portable media device a sound field resulting from one or more calibration signals of known or determinable characteristics being played back on the portable media device while the output of the portable media device is coupled to the input of the first playback system, the first playback system comprising a first amplifier and a first loudspeaker arrangement of at least one loudspeaker, the recording using a microphone built in or connected to the portable media device while the microphone is at one or more listener locations of the first listening arrangement;

(b) calculating the first set of one or more corrective filters using the recorded sound field, the calculated first set being at least to equalize for playback from the portable media device via the first playback system in the first listening arrangement, the calculating being carried out on the portable media device or on a remote processing system coupled to the portable media device, such that none of the calculating is required to be carried out in the first playback system; and (c) carrying out the pre-storing of the filter data for the calculated first set of one or more corrective filters for the first listening arrangement that includes the first playback system.

11. The non-transitory computer-readable medium as recited in claim 10, wherein the collection includes a plurality of sets of corrective filters, and wherein at least one of the collection of sets of corrective filters is a default set predefined for a class of listening arrangements with respective playback systems.

12. The non-transitory computer-readable medium as recited in claim 10, wherein the data for the one or more sets of corrective filters are stored in a storage subsystem included in the portable media device.

13. The non-transitory computer-readable medium as recited in claim 10, wherein the pre-storing in or for the portable media device of the filter data for the first set of one or more corrective filters includes pre-storing an indicator that the first set of one or more corrective filters is associated with the first listening arrangement that includes the first playback system.

14. The non-transitory computer-readable medium as recited in claim 10, wherein the portable media device includes a user interface, and wherein the calibration method for the first listening arrangement includes receiving on the user interface an indication from a user to carry out the recording, calculating, and pre-storing steps of the calibration method.

15. The non-transitory computer-readable medium as recited in claim 10, wherein portable media device is coupled by a network to a remote processing system, and wherein the calculating of the first set includes:

sending the recorded sound field or data related thereto to the remote processing system, calculating the first set in the remote processing system, and receiving the calculated first set or the data therefor via the network from the remote processing system.

16. The non-transitory computer-readable medium as recited in claim 10, wherein the calculating the first set is carried out by at least one of the one or more processors included in the portable media device.

17. The non-transitory computer-readable medium as recited in claim 10, wherein the pre-storing of the filter data of first set of one or more corrective filters is into a storage subsystem remote from the portable media device, such that the filter-subsystem data of the first set are loaded into the portable media device when or before the portable media device is coupled to the first playback system in the first listening arrangement.

18. A portable media device comprising:

a playback subsystem configured to play back a selected audio signal;

a filter subsystem coupled to the playback subsystem and configured to implement and apply a set of one or more corrective filters during playback of the audio signal by the playback subsystem, the playback and filter subsystems operative to generate a filtered selected audio signal;

a memory wherein data or an indication thereof for the filter subsystem to implement at least a first set of one or more corrective filters is stored, the first set corresponding to a first listening arrangement of a collection of one or more listening arrangements for playback using the portable media device, each of the one or more sets having a corresponding listening arrangement comprising the portable media device and a corresponding playback system, each corresponding playback system being separate and distinct from the portable media device, and comprising a corresponding input operatively coupleable to the output of the portable media device, a corresponding amplifier, and a corresponding loudspeaker arrangement of at least one loudspeaker;

an output configured to output the filtered selected audio signal from the portable media device;

a user interface configured to accept input from a user; and a microphone or a coupling to a microphone;

wherein the first listening arrangement comprises the portable media device and a first playback system, the first playback system having a first input and being separate and distinct from the portable media device, the output of the portable media device being operatively coupleable to the first input in order to play the first selected audio signal via the first playback system, such that when the output of the portable media device is coupled to the first input of the first playback system, a listener at a listening position in the first listening arrangement can hear the filtered selected audio signal played back via the first playback system, wherein data for the filter subsystem to implement ("filter data for") each of the one or more sets, including the first set of one or more corrective filters, is pre-stored in or for the portable media device by a calibration process, wherein the calibration process for the first listening arrangement includes:

(a) recording on the portable media device via the microphone a sound field resulting from one or more calibration signals of known or determinable characteristics being played back on the portable media device while the output portable media device is coupled to the input of the first playback system, the recording being while the microphone is at one or more listener locations of the first listening arrangement;

(b) calculating the first set of one or more corrective filters using the recorded sound field, the first set when applied being at least to equalize for playback from the portable media device via the first playback system in the first listening arrangement, the calculating being carried out on the portable media device and/or on a remote processing system coupled to the portable media device, such that none of the calculating is required to be carried out in the first playback system, and (c) pre-storing the filter data for the first set of one or more corrective filters in or for the portable media device for the first listening arrangement that includes the first playback system.

19. The portable media device as recited in claim 18, further comprising:

one or more processors; and a storage subsystem comprising the memory and coupled to the filter subsystem and to at least one processor of the one or more processors, wherein applying the first set of one or more corrective filters includes digitally processing digital signals on at least one of the one or more processors.

20. The portable media device as recited in claim 18, wherein the storing the filter data for the first set of one or more corrective filters in or for the portable media device for the first playback system in the first listening arrangement includes pre-storing an indicator that the first set of one or more corrective filters is associated with the first listening arrangement that includes the first playback system.

21. The portable media device as recited in claim 18, wherein the user interface is configured to receive an indication from a user to carry out the recording, calculating, and pre-storing of the filter data for first set of one or more corrective filters or the data therefor.

22. The portable media device as recited in claim 18, further comprising a network interface to couple the portable media device to a remote processing system via a network, wherein the portable media device is configured, for the calculating of the first set, to:

send the recorded sound field or data related thereto to the remote processing system such that the remote processing system can calculate the first set, and, after the remote processing system carries out the calculating, receive the calculated first set or the data therefor via the network from the remote processing system.

23. The portable media device as recited in claim 18, further comprising:

one or more processors; and a storage subsystem comprising the memory and coupled to at least one processor of the one or more processors, wherein the calculating of the first set is carried out by at least one processor of the one or more processors.

24. The portable media device as recited in claim 18, comprising components to enable the portable media device to operate as a portable telephone.

25. The portable media device as recited in claim 18, wherein at least one of sets of corrective filters is a default set predefined for a class of listening arrangements of the collection each with a respective remote playback.

26. The method of claim 1, wherein the calibration method further comprises:

(d) repeating steps (a) to (c) for at least a second listening arrangement, such that for each of the collection of listening arrangements, there is pre-stored in or for the portable media device the filter data for the corresponding set of one or more corrective filters.

27. The non-transitory computer-readable medium of claim 10, wherein the calibration method further comprises:

(d) repeating steps (a) to (c) for at least a second listening arrangement, such that for each of the collection of one or more listening arrangements, there is pre-stored in or for the portable media device the filter data for the corresponding set of one or more corrective filters.

* * * * *